United States Patent
Li

(10) Patent No.: US 12,282,163 B2
(45) Date of Patent: Apr. 22, 2025

(54) OPTICAL WAVEGUIDE SYSTEM AND ELECTRONIC DEVICE

(71) Applicant: Goertek Inc., Shandong (CN)

(72) Inventor: Lingshan Li, San Jose, CA (US)

(73) Assignee: Goertek Inc., Shandong (CN)

( * ) Notice: Subject to any disclaimer, the term of this patent is extended or adjusted under 35 U.S.C. 154(b) by 466 days.

(21) Appl. No.: 17/566,048

(22) Filed: Dec. 30, 2021

(65) Prior Publication Data

US 2023/0213760 A1 Jul. 6, 2023

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0036* (2013.01); *G02B 2027/0123* (2013.01)

(58) Field of Classification Search
CPC ............ G02B 27/0172; G02B 27/0081; G02B 27/017; G02B 2027/0123; G02B 2027/0178; G02B 6/0016; G02B 6/0036; G02B 5/18

See application file for complete search history.

(56) References Cited

U.S. PATENT DOCUMENTS

| | | | |
|---|---|---|---|
| 10,690,851 B2 | 6/2020 | Waldern et al. | |
| 11,067,811 B2 | 7/2021 | Chi et al. | |
| 11,119,343 B2 * | 9/2021 | Geng | G02B 5/3025 |
| 2016/0313556 A1 * | 10/2016 | Futterer | G02F 1/292 |
| 2020/0081252 A1 | 3/2020 | Jamali et al. | |
| 2021/0055551 A1 * | 2/2021 | Chi | G02B 6/005 |
| 2021/0055553 A1 * | 2/2021 | Chi | H04N 9/3152 |
| 2021/0191122 A1 * | 6/2021 | Yaroshchuk | G02B 27/4205 |
| 2022/0107517 A1 * | 4/2022 | Yaroshchuk | G02B 3/14 |
| 2023/0176382 A1 * | 6/2023 | Drazic | G02B 27/0172 |
| | | | 385/37 |

FOREIGN PATENT DOCUMENTS

CN 113341569 A * 9/2021

OTHER PUBLICATIONS

CN_113341569_A (English Translation) (Year: 2021).*

(Continued)

*Primary Examiner* — Marin Pichler
*Assistant Examiner* — Mary A El-Shammaa
(74) *Attorney, Agent, or Firm* — Baker Botts LLP

(57) ABSTRACT

An optical waveguide system and an electronic device are disclosed. The system comprises: a waveguide; an input coupler coupling a light into the waveguide; and an output coupler, wherein the input coupler includes a right portion and a left portion, wherein the right portion includes stacked first and second polarization volume gratings, the left portion includes stacked third and fourth polarization volume gratings. The first and fourth polarization volume gratings are polarization volume gratings optimized for a right-hand-side field of view of the light, and the third and second polarization volume gratings are polarization volume gratings optimized for a left-hand-side field of view of the light.

10 Claims, 3 Drawing Sheets

(56) References Cited

OTHER PUBLICATIONS

Lee et al., "Reflective polarization volume gratings for high efficiency waveguide-coupling augmented reality displays," Optics Express, 25(22): 27008-27014 (2017) doi:10.1364/OE.25.027008.
Li et al., "Improved saturation and wide-viewing angle color filters based on multi-twist retarders," Optics Express, 29(3): 4124-4138 (2021).
Li et al., "Super achromatic wide-angle quarter-wave plates using multi-twist retarders," in Optics Express, 29(5): 7464-7478 (2021).
Li et al., "Solc-style color filters based on multi-twist retarders," Novel Optical Systems, Methods, and Applications XXIII, vol. 11483, SPIE, 136-149 (2020) doi:10.1117/12.2569133.
Xiang et al., "Numerical analysis of Bragg polarization gratings," Josa B., 36(5): D1--D8 (2019).
Xiang et al., "Nanoscale liquid crystal polymer Bragg polarization gratings," Optics Express, 25(16):19298-19308 (2017) doi:10.1364/OE.25.019298.
Xiang et al., "Bragg polarization gratings for wide angular bandwidth and high efficiency at steep deflection angles," Sci Rep., 8(1):7202 (2018) doi:10.1038/s41598-018-25535-0.
Yin Polarization Volume Gratings for Near-Eye Displays and Novel Photonic Devices, Crystals, 10(7):561, 18 pages (2020).

\* cited by examiner

OPTICAL WAVEGUIDE SYSTEM AND ELECTRONIC DEVICE

FIELD OF THE INVENTION

This disclosure relates to the technical field of optical waveguide system, and more specifically, to an optical waveguide system and an electronic device.

BACKGROUND OF THE INVENTION

In an optical display system such as a near-eye display (NED) system, a ray emerged from a display with certain field of view (FOV) is in-coupled to a waveguide (WG) by an input coupler grating (ICG), undergoes total internal reflection (TIR) and pupil expansion, and is finally out-coupled by an output coupler grating (OCG).

The rendering image reconstruction relies on the TIR conditions and grating equations to be satisfied by all angles within FOV. The traditional surface-relief-grating (SRG) based waveguide system has limited angle response due to the grating equation of 1st order for a certain wavelength. For different wavelength of light, the limited angle response of the grating can allow the majority of the FOV to be transmitted. But more often, there are some field that can be outside of the 1st order condition or TIR condition, making these field to be lost. The SRG slanted grating can has wider angle response compared to blazed and binary gratings, but still the slanted grating is subjected to limited FOV. For the augmented reality (AR) technologies, a wider FOV system with small form factor and large eyebox is ideal for better image rendering and thus can enhance user experience.

The article of "Improved saturation and wide-viewing angle color filters based on multi-twist retarders" by Li L, Shi S, Escuti M J in Opt Express. 2021; 29(3):4124-4138 discloses saturation and wide-viewing angle color filters based on multi-twist retarders, which is hereby incorporated in its whole by reference.

The article of "Super achromatic wide-angle quarter-wave plates using multi-twist retarders" by Li L, Escuti M J in Opt Express. 2021; 29(5):7464-7478 discloses achromatic wide-angle quarter-wave plates using multi-twist retarders, which is hereby incorporated in its whole by reference.

The article of "Numerical analysis of Bragg polarization gratings" by Xiang X, Escuti M J in JOSA B. 2019; 36(5):D1-D8 discloses Bragg polarization gratings, which is hereby incorporated in its whole by reference.

The article of "Nanoscale liquid crystal polymer Bragg polarization gratings" by Xiang X, Kim J, Komanduri R. Escuti M J in Opt Express. 2017; 25(16):19298. doi: 10.1364/OE.25.019298 discloses nanoscale liquid crystal polymer Bragg polarization gratings, which is hereby incorporated in its whole by reference.

The article of "Bragg polarization gratings for wide angular bandwidth and high efficiency at steep deflection angles" by Xiang X. Kim J, Escuti M J in Sci Rep. 2018; 8(1):7202. doi:10.1038/s41598-018-25535-0 discloses Bragg polarization gratings, which is hereby incorporated in its whole by reference.

The article of "Reflective polarization volume gratings for high efficiency waveguide-coupling augmented reality displays" by Lee Y-H, Yin K, Wu S-T in Opt Express. 2017; 25(22):27008. doi:10.1364/OE.25.027008 discloses reflective polarization volume gratings, which is hereby incorporated in its whole by reference.

The article of "Volume Bragg gratings for near-eye waveguide display" by Chi W, Lee H Y, Saarikko P Published online in 2021 discloses volume Bragg gratings, which is hereby incorporated in its whole by reference.

The article of "Dispersion compensation in volume bragg grating-based waveguide display" by Chi W, Meiser D. Yang Y, Lam W S T, Saarikko P Published online in 2021 discloses a volume bragg grating-based waveguide display, which is hereby incorporated in its whole by reference.

The article of "Optical waveguide beam splitter with polarization volume gratings for display" by Geng Y, Gollier, Jacques in Amirsolaimani B., 2021:2 discloses polarization volume gratings, which is hereby incorporated in its whole by reference.

The article of "Polarization-sensitive components in optical systems for large pupil acceptance angles" by Amali A. Lu L, Maimone A, Moheghi A, Lam W S T, McEldowney, S. Charles Lanman D R Published online in 2020 discloses polarization-sensitive components in optical systems for large pupil acceptance angles, which is hereby incorporated in its whole by reference.

The article of "Holographic waveguides incorporating birefringence control and methods for their fabrication" by David W J, Popvich M, Grant A J., Search Published online in 2021 discloses holographic waveguides, which is hereby incorporated in its whole by reference.

The article of "Polarization volume gratings for near-eye displays and novel photonic devices" by Yin K, Zhan T, Xiong J, He Z, Wu S-T in Crystals. 2020; 10(7):561 discloses polarization volume gratings for near-eye displays, which is hereby incorporated in its whole by reference.

The article of "Sole-style birefringent color filters based on multi-twist retarders" by Li L, Shi S, Escuti M J. In: Hahlweg C F, Mulley J R, eds in Novel Optical Systems, Methods, and Applications XXIII. Vol 11483. SPIE; 2020: 136-149. doi:10.1117/12.2569133 discloses Solc-style birefringent color filters based on multi-twist retarders, which is hereby incorporated in its whole by reference.

SUMMARY OF THE INVENTION

One object of this disclosure is to provide a new technical solution for an optical waveguide system.

According to a first aspect of the present disclosure, there is provided an optical waveguide system, comprising: a waveguide; an input coupler, provided at an input side of the waveguide and coupling a light into the waveguide; and an output coupler, provided at an output side of the waveguide and coupling the light out of the waveguide, wherein the input coupler includes a right portion and a left portion, wherein the right portion is located at the right side of the input coupler and the left portion is located at the left side of the input coupler, from light incident direction, wherein the right portion includes a first polarization volume grating and a second polarization volume grating stacked under the first polarization volume grating, wherein the left portion includes a third polarization volume grating and a fourth polarization volume grating stacked under the third polarization volume grating, wherein the first polarization volume grating and the fourth polarization volume grating are polarization volume gratings optimized for a right-hand-side field of view of the light, and wherein the third polarization volume grating and the second polarization volume grating are polarization volume gratings optimized for a left-hand-side field of view of the light.

According to a first aspect of the present disclosure, there is provided an electronic device, comprising: a display, which generates an image light; and an optical waveguide system according to an embodiment, which receives the image light.

According to an embodiment of this disclosure, the performance of an optical waveguide system can be improved.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the invention.

DETAILED DESCRIPTION OF THE EMBODIMENTS

Figure 1:
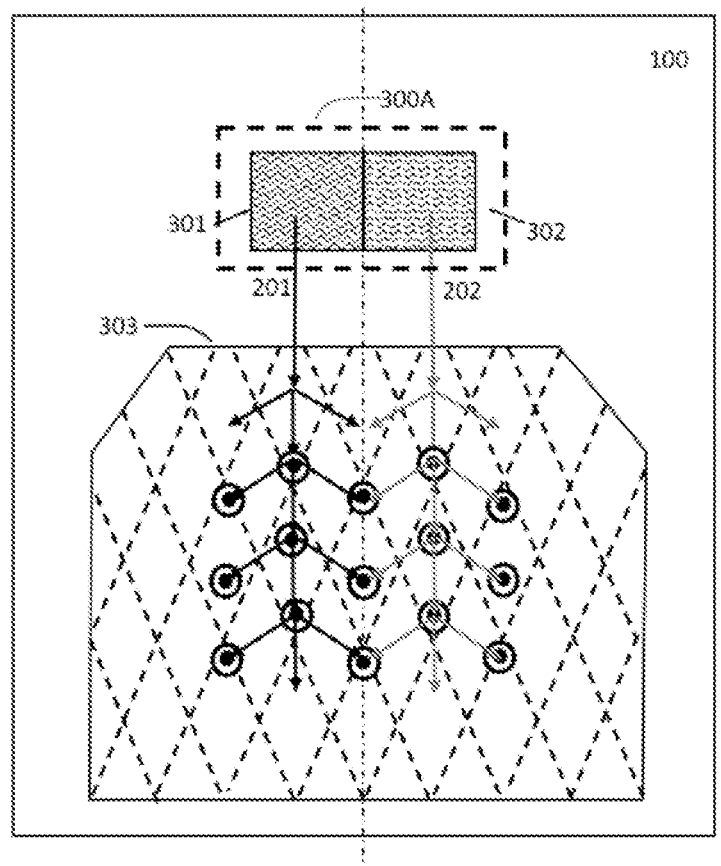
FIG. 1 shows a schematic diagram of an optical waveguide system according to an embodiment.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

A polarization Bragg grating (PBGs) or polarization volume gratings (PVGs) made of liquid crystal (LC) or liquid crystal polymer (LCP) can obtain a wider FOV. The polarization volume gratings are usually fabricated by holography method of adding or subtracting the wavevector of object wave and reference wave with orthogonal polarization coherence light. Combining the holography method and the polarization interference method, the interference pattern between these two waves with orthogonal circular polarization creates the grating vectors of the polarization volume gratings. Both LC cell or LCP film grating period can be obtained using the above method. To further control the wavelength and angle response of the grating, twist might also be applied to one or two layer of LCP film. Different from the SRG-based system, the polarization volume grating is a kind of polarization active mechanism.

In this regard, the inventor has investigated the possibility of multiplexing different angle of the light field by incorporating several PVGs and other polarization elements into one stack. With the help of the wide-view liquid crystal polymer (LCP) film to control the polarization of one or all visible wavelength into right-hand-circular polarization (RCP) or left-hand-circular polarization (LCP), the inventor finds that the angle multiplexing of PVGs can facilitate an AR system with expanded FOV.

The inventor finds that the transmissive PVGs usually has larger operational wavelength than reflective PVGs. So, the transmissive PVGs operating at transmissive mode are adopted here.

The inventor proposes to implement the FOV expansion angle multiplexing by using two PVGs stacked together, each of which is mainly responsible for half of the FOV. When these two PVGs for plus and minus half of the FOV are stacked, the actual FOV can be expanded into a whole wide FOV. Due to the fact that the azimuth angle response is different for the right side of the ICGs with the left side of the ICGs, a stack of two PVGs at each side of the image can be applied for the right or left side of the image.

Here, the inventor uses the angle multiplexing polarization volume gratings to optimize polarization volume grating operation angle range. Using the stacked angle-optimized PVGs can effectively expand the in-coupling FOV.

In an embodiment, as shown in FIG. 1, an optical waveguide system may comprise a waveguide 100, an input coupler 300A and an output coupler 303. The input coupler 300A is provided at an input side of the waveguide 100 and couples a light into the waveguide 100. The output coupler 303 is provided at an output side of the waveguide 100 and couples the light out of the waveguide 100.

The output coupler 303 may be a two-dimensional surface relief grating, which expands and out-couples the light. Such a two-dimension surface relief grating may improve uniformity of a displayed image. The two-dimensional surface relief grating may have a diamond lattice.

The input coupler 300A includes a right portion 301 and a left portion 302. It shall be understood by a person skilled in the art that the right portion 301 is located at the right side of the input coupler 300A and the left portion 302 is located at the left side of the input coupler 300A, from light incident direction.

Figure 2:
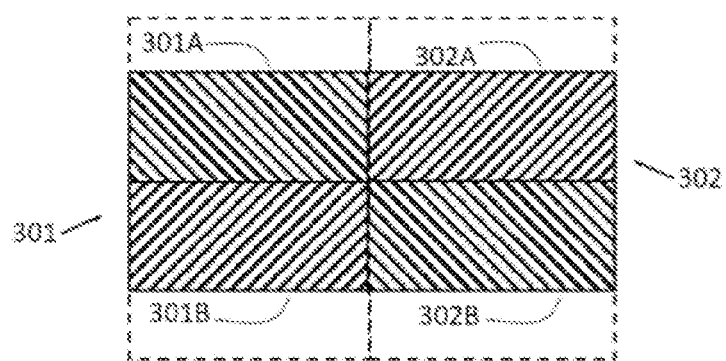
FIG. 2 shows a schematic structure of an input coupler in FIG. 1.

As shown in FIG. 2, the right portion 301 includes a first polarization volume grating 301A and a second polarization volume grating 301B. The second polarization volume grating 301B are stacked under the first polarization volume grating 301A. The left portion 302 includes a third polarization volume grating 302A and a fourth polarization volume grating 302B. The fourth polarization volume grating 302B is stacked under the third polarization volume grating 302A.

The first polarization volume grating 301A and the fourth polarization volume grating 302B are polarization volume gratings optimized for a right-hand-side field of view of the light. The third polarization volume grating 302A and the second polarization volume grating 301B are polarization volume gratings optimized for a left-hand-side field of view of the light.

Optimization for the right/left hand side means that at least one performance of the grating at the right/left hand side is better than that at the left/right hand side. Here, the performance could be FOV. For example, the first polarization volume grating 301A and the fourth polarization volume grating 302B have un-symmetric field of views, of which right portions are larger than their left portions. The third polarization volume grating 302A and the second polarization volume grating 301B have un-symmetric field of views, of which left portions are larger than their left portions.

In the embodiment, the first polarization volume grating 301A and the second polarization volume grating 301B are stacked together while they have different optimizations. Similarly, the third polarization volume grating 302A and the fourth polarization volume grating 301B are stacked together while they have different optimizations. By adopting these configurations, uniformity of image in the field of view may be improved. Furthermore, by the diffraction efficiency may also be improved.

As shown in FIG. 1, the light/ray 201 on the right side and the light/ray 202 on the left enter output coupler 303 and are coupled out of the waveguide 100.

Because the light 201 and the light 202 have wide-angle response, the out-coupling of these two lights into the two-dimensional surface relief grating 303 can therefore have a wide FOV and retain good color uniformity of RGB, resulting high uniformity of color and brightness on the output on the two-dimensional surface relief grating 303. Besides, because the stack of gratings 301 has retain large intensity of right side of the input image, the ray 201 inherits the high intensity and full FOV of RGB, which continues to transmit to the right side of the eyebox, resulting in better brightness and color uniformity. The similar situation also applies to the left side.

For example, the FOV of the first polarization volume grating 301A and the fourth polarization volume grating 302B are (−30°, 10°), and the field of views of the third polarization volume grating 302A and the second polarization volume grating 301B are (−10°, 30°).

For example, the first, second, third and fourth polarization volume gratings 301A, 301B, 302A and 302B are transmissive polarization volume gratings.

Figure 3:
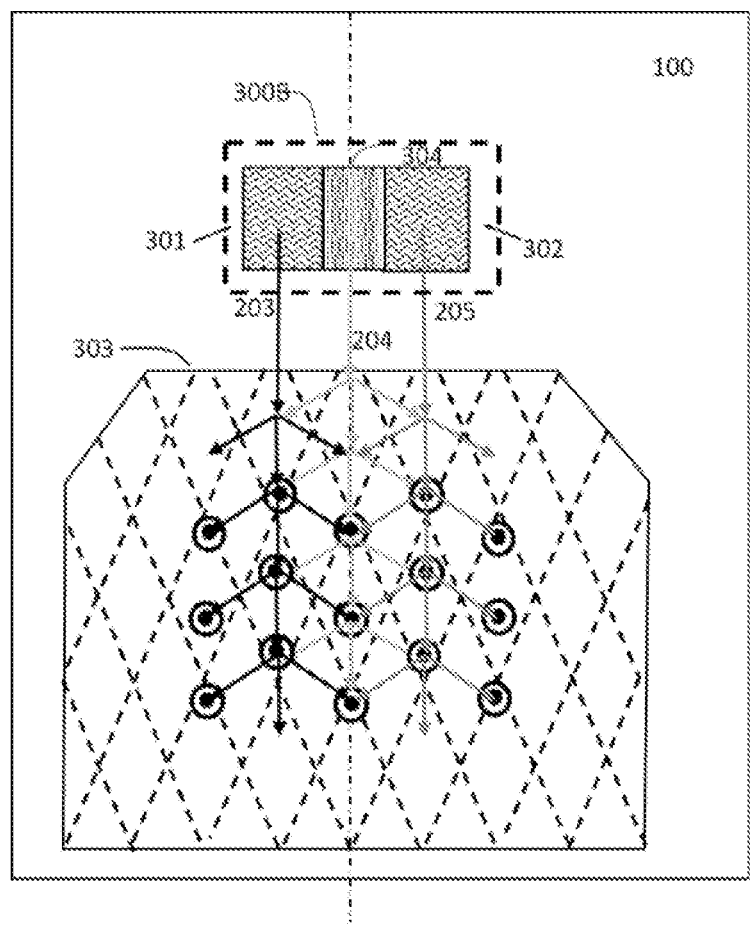
FIG. 3 shows a schematic diagram of an optical waveguide system according to another embodiment.
Figure 4:
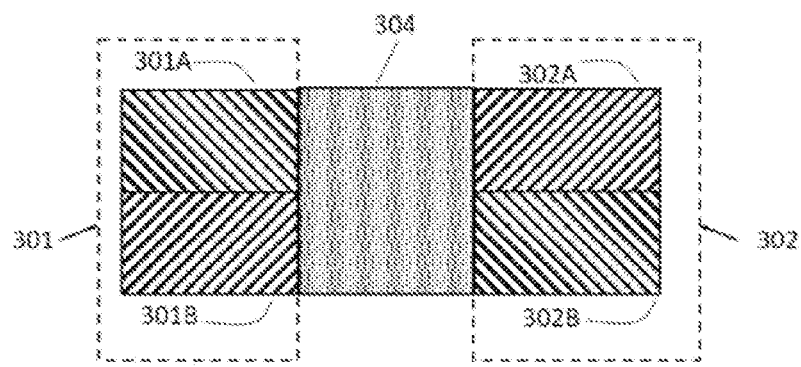
FIG. 4 shows a schematic structure of an input coupler in FIG. 3.

FIG. 3 and FIG. 4 show an optical waveguide system according to another embodiment. As shown in FIG. 3 and FIG. 4, the input coupler 300B further includes a central polarization volume grating 304. The central polarization volume grating 304 is provided between the right portion 301 and left portion 302. The central polarization volume grating 304 is optimized for central field of view. The central polarization volume grating 304 can further enhance the central FOV brightness.

The central polarization volume grating 304 has a symmetric field of view. This symmetric field of view may be overlapped with at least part of those of the first, second, third and fourth polarization volume gratings 301A. 301B, 302A and 302B.

For example, the field of view of the central polarization volume grating 304 is (−15°, 15°).

Figure 5:
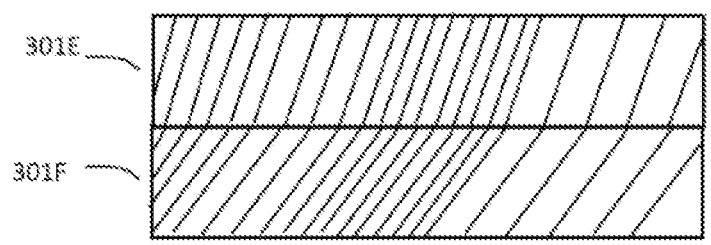
FIG. 5 shows a schematic structure of an input coupler according to another embodiment.

FIG. 5 shows a schematic structure of an input coupler 300C according to another embodiment. The input coupler 300C can be used in the optical waveguide system shown in FIG. 1 or FIG. 3.

In the input coupler 300C of FIG. 5, the first and third polarization volume gratings 301A, 302A are made by liquid crystal polymers in a first liquid crystal layer 301E. The second and fourth polarization volume gratings 301B, 302B are made by liquid crystal polymers in a second liquid crystal layer 301F.

The first liquid crystal layer 301E and the second liquid crystal layer 301F have same period variation along grating plane, but have different grating vectors and/or period localization.

In this embodiment, since the four gratings are implemented in the two liquid crystal layers and the two liquid crystal layers have the same period variation, the structure is made in a continuous manner, which will reduce the energy retained in the un-continuous positions. As such, the diffraction efficiency will be increased. In addition, the performance of the input coupler will be improved.

The optical waveguide system may further comprise a polarizer, provided before the input coupler 300A, 300B or 300C. The polarizer can convert the light into a polarized light which can be diffracted by the output coupler 300A, 300B or 300C. The polarized light can be efficiently processed in the optical waveguide system and stray lights can be reduced in the system.

The polarization volume gratings in various embodiment may be liquid crystal-based polarization volume gratings.

The FOVs of the polarization volume gratings in various embodiments may be on purpose to have some overlapping, to guarantee that an image has no transmission gap on the angles. The FOV and wavelength response of each PVG are listed in Table. 1.

TABLE 1

Grating operation angle summary

|  | FOV | Wavelength |
|---|---|---|
| 301A | (−30°, 10°) Unsymmetric | RGB |
| 301B | (−10°, 30°) Unsymmetric | RGB |
| 302A | (−10°, 30°) Unsymmetric | RGB |
| 302B | (−30°, 10°) Unsymmetric | RGB |
| 304 | (−15°, 15°) Symmetric | RGB |

Figure 6:
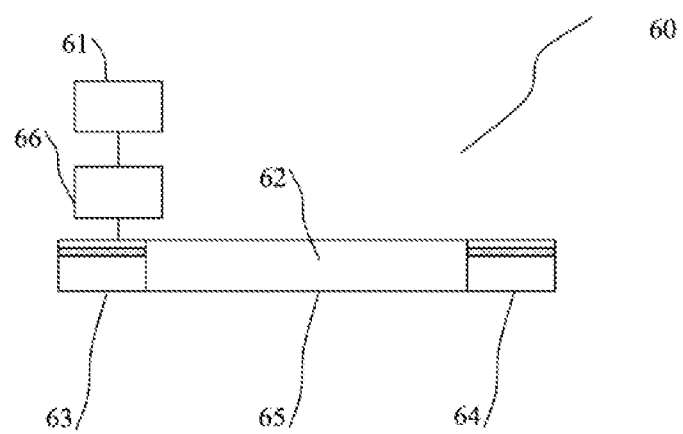
FIG. 6 shows a schematic block diagram of an electronic device according to an embodiment.

FIG. 6 shows a schematic block diagram of an electronic device according to an embodiment.

In FIG. 6, the electronic device 60 comprises a display 61 and an optical waveguide system 62. The display 61 generates an image light. The optical waveguide system 62 may be the optical waveguide system as described above and receives the image light. The optical waveguide system 62 includes an input coupler 63, a waveguide 65 and an output coupler 64 as described above. The optical waveguide system 62 may further include a polarizer 66 as described above to convert the image light into a polarized image light, which is then processed by the input coupler 63.

Figure 7:
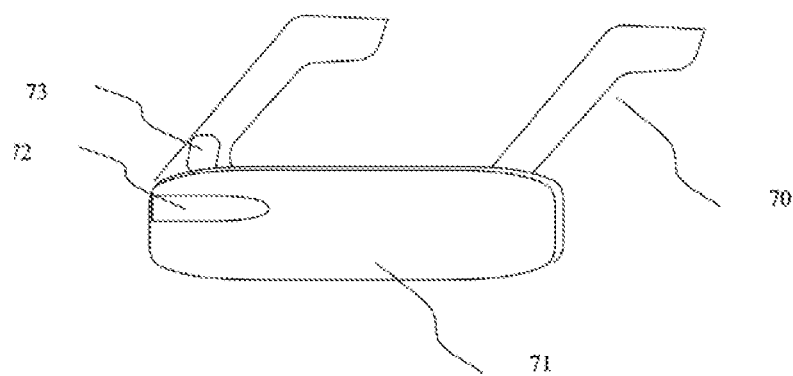
FIG. 7 shows an example of an electronic device.

FIG. 7 shows an example of an electronic device according to an embodiment. In FIG. 7, the electronic device 71 may be a near-eye display such as an AR glass. The electronic device 71 may include a display 73 and an optical display system 72 as described above.

Although some specific embodiments of the present invention have been demonstrated in detail with examples, it should be understood by a person skilled in the art that the above examples are only intended to be illustrative but not to limit the scope of the present disclosure.

What is claimed is:
1. An optical waveguide system, comprising
a waveguide;

an input coupler, provided at an input side of the waveguide and coupling a light into the waveguide; and
an output coupler, provided at an output side of the waveguide and coupling the light out of the waveguide,
wherein the input coupler includes a right portion and a left portion,
wherein the right portion is located at the right side of the input coupler and the left portion is located at the left side of the input coupler, from light incident direction,
wherein the right portion includes a first polarization volume grating and a second polarization volume grating stacked under the first polarization volume grating,
wherein the left portion includes a third polarization volume grating and a fourth polarization volume grating stacked under the third polarization volume grating,
wherein, from the light incident direction, the first polarization volume grating and the second polarization volume grating, are located at the right of the third polarization volume grating and the fourth polarization volume grating,
wherein the first polarization volume grating and the fourth polarization volume grating are polarization volume gratings optimized for a right-hand-side field of view of the light, and
wherein the third polarization volume grating and the second polarization volume grating are polarization volume gratings optimized for a left-hand-side field of view of the light, and
wherein the first polarization volume grating and the fourth polarization volume grating each have a first un-symmetric field of view with a right portion thereof larger than a left portion thereof, wherein the third polarization volume grating and the second polarization volume grating each have a second un-symmetric field of view with a left portion thereof larger than a right portion thereof.

2. The optical waveguide system according to claim 1, wherein
the field of views of the first polarization volume grating and the fourth polarization volume grating are (−30°, 10°),
wherein the field of views of the third polarization volume grating and the second polarization volume grating are (−10°, 30°).

3. The optical waveguide system according to claim 1, further comprising
a central polarization volume grating, which is provided between the right portion and left portion and which is optimized for central field of view.

4. The optical waveguide system according to claim 3, wherein
the central polarization volume grating has a symmetric field of view overlapping at least part of the field of views of the first, second, third and fourth polarization volume gratings.

5. The optical waveguide system according to claim 4, wherein
the field of view of the central polarization volume grating is (−15°, 15°).

6. The optical waveguide system according to claim 1, wherein
the output coupler includes a two dimensional surface relief grating.

7. The optical waveguide system according to claim 1, wherein
the first, second, third and fourth polarization volume gratings are transmissive polarization volume gratings.

8. The optical waveguide system according to claim 1, further comprising
a polarizer, provided before the input coupler for converting the light into a polarized light to be diffracted by the output coupler.

9. The optical waveguide system according to claim 1, wherein
the first and third polarization volume gratings are made by liquid crystal polymers in a first liquid crystal layer,
wherein the second and fourth polarization volume gratings are made by liquid crystal polymers in a second liquid crystal layer,
wherein the first liquid crystal layer and the second liquid crystal layer have a period variation along grating plane, and different grating vectors and/or a different period localization.

10. An electronic device, comprising
a display, which generates an image light; and
an optical waveguide system according to claim 1, which receives the image light.

* * * * *